United States Patent [19]

Schwartz

[11] 3,924,185
[45] Dec. 2, 1975

[54] ELECTRICAL METER CONSTRUCTION

[75] Inventor: Edwin L. Schwartz, Los Angeles, Calif.

[73] Assignee: Rite Autotronics Corporation, Los Angeles, Calif.

[22] Filed: Aug. 30, 1973

[21] Appl. No.: 392,946

[52] U.S. Cl. .............................. 324/115; 200/11 G
[51] Int. Cl.² ................... G01R 15/08; H01H 19/58
[58] Field of Search........ 324/115, 156; 200/11 DA, 200/11 G

[56] References Cited
UNITED STATES PATENTS

| | | | |
|---|---|---|---|
| 2,792,549 | 5/1957 | Bernreuter | 324/115 |
| 2,896,033 | 7/1959 | Hartz | 200/11 G |
| 3,303,296 | 2/1967 | Scott | 200/11 G |
| 3,518,389 | 6/1970 | Doering, Jr. et al. | 200/11 G |
| 3,544,896 | 12/1970 | Solow | 324/115 |
| 3,594,527 | 7/1971 | Brant et al. | 200/11 G |
| 3,609,258 | 9/1971 | Leland | 200/11 DA |

*Primary Examiner*—R. V. Rolinec
*Assistant Examiner*—Ernest F. Karlsen
*Attorney, Agent, or Firm*—Robert E. Geauque

[57] ABSTRACT

An electrical meter apparatus wherein the elements of construction of the meter are so constructed as to not warrant any significant amount of precision in manufacture, a selector knob being connected to a switch rotor with the switch rotor being mounted upon a panel bushing which is in turn fixedly connected to the meter housing, a limited amount of canting movement is permitted along with the normal rotative movement between the switch rotor and the panel bushing, the switch rotor to be connected in a non-precision manner with a socket and a plug, the plug being loose fittingly connected within an opening in the printed circuit board of the meter, a limited amount of canting movement of the plug capable of occurring with respect to the printed circuit board, electrical contact elements include spring means which are to physically contact the printed circuit board and tend to maintain the plug in axial alignment within the opening.

4 Claims, 7 Drawing Figures

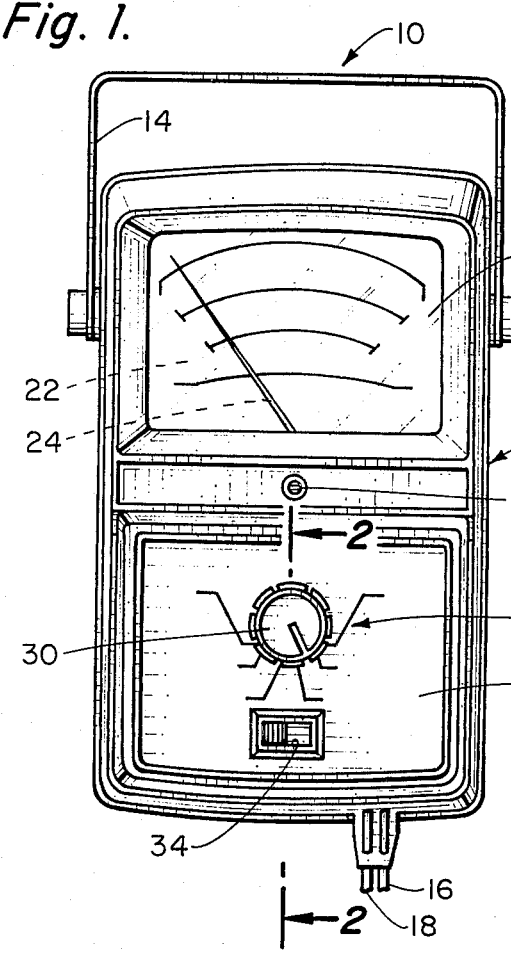
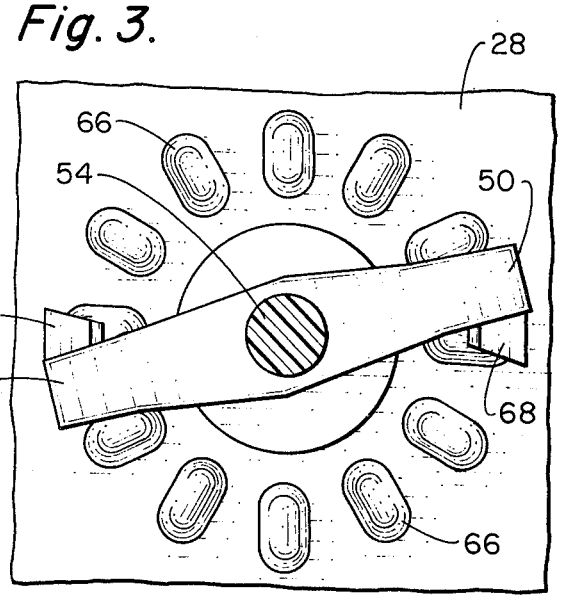
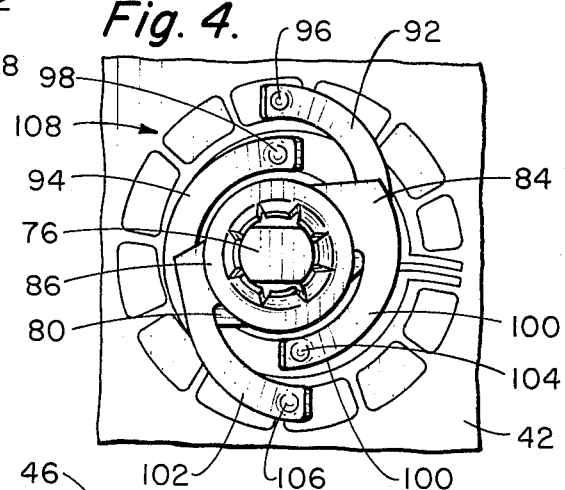
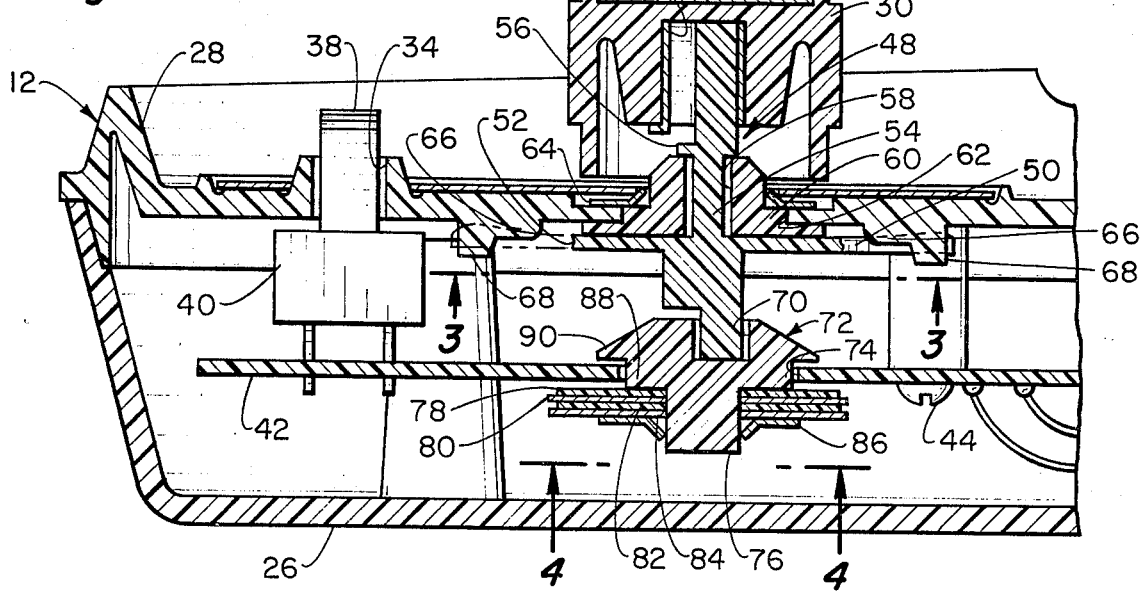

Fig. 5.
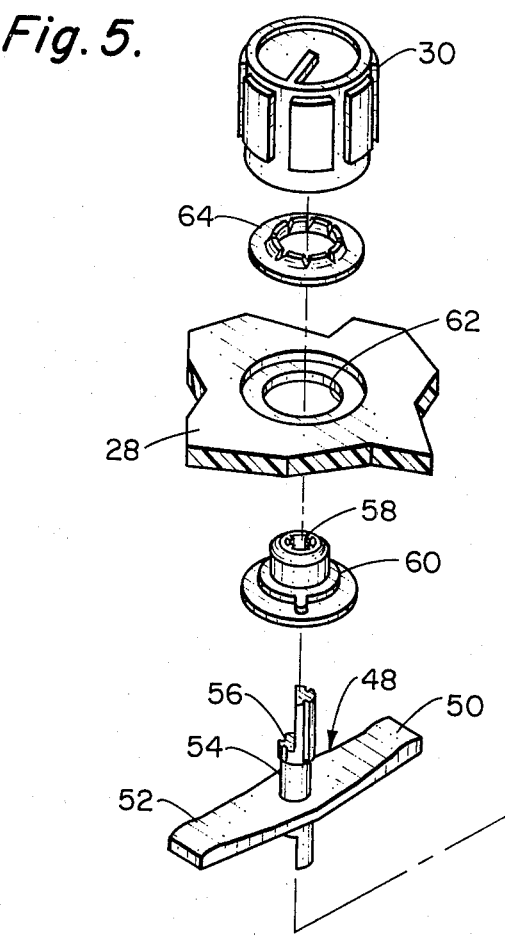
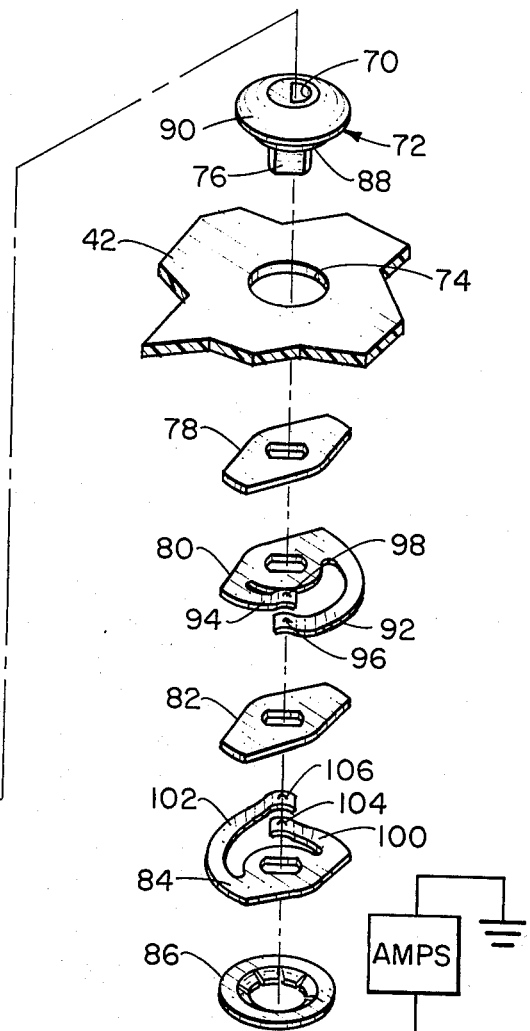
Fig. 6.
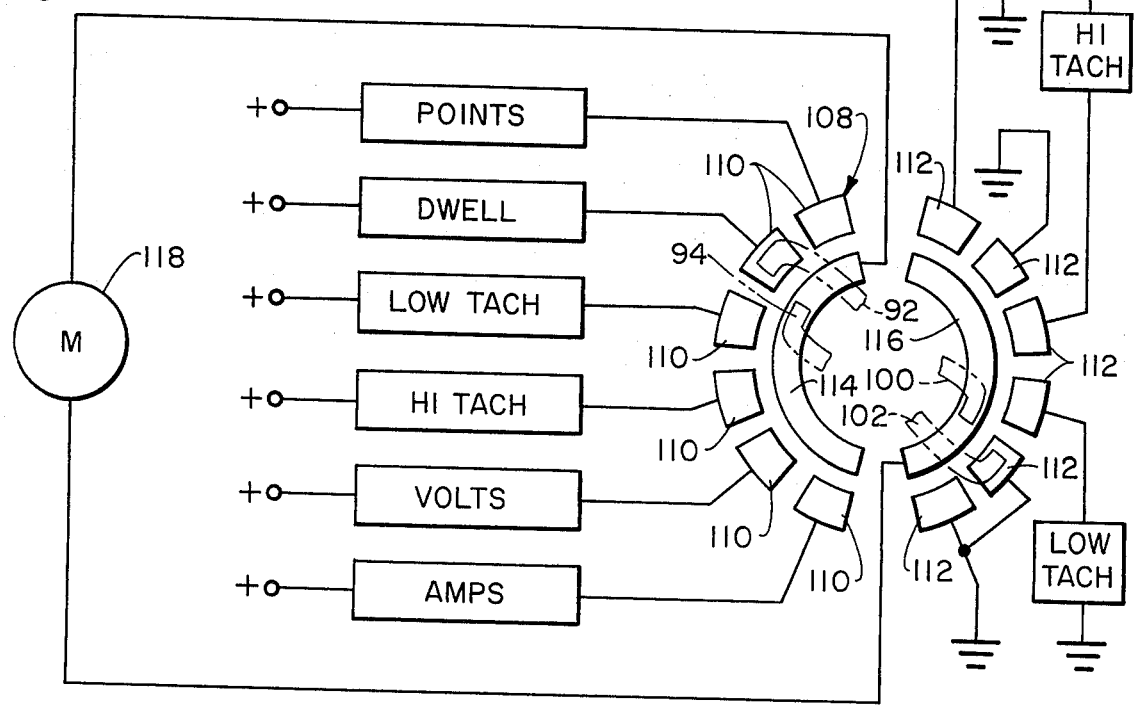

ELECTRICAL METER CONSTRUCTION

BACKGROUND OF THE INVENTION

In the construction of electrical meters, a serious drawback to minimizing the cost of construction has been the precision which is required between the interrelated parts of the meter. The elements which connect with the manually rotatable knob of a meter, and the elements which interconnect the knob with the printed circuit board within the meter, have previously been thought to be required to be manufactured quite accurately in order for the different parts of the meter to connect together when assembled and also, to minimize the wear between the elements of the meters so as to permit the meter to have a satisfactory useful life. Precision parts are a costly factor in any meter construction. Yet, such precision between the interrelated parts of an electrical meter could be eliminated without foregoing accuracy of the meter or lowering the useful life of the meter. The manufacturing cost of such a meter could be substantially lowered which would make such meters more readily available to a greater proportion of the purchasing public.

SUMMARY OF THE INVENTION

The meter construction of this invention is to employ a conventional meter D'arsonval movement mounted within the housing of the meter. A manual selector knob is attached to the housing and is to effect rotation of a rotor switch. The rotor switch is movable to various fixed positions and tends to remain in a said position until it is manually moved out of that position. The rotor switch is connected to the housing by means of a panel bushing. The panel bushing permits free rotative movement of the rotor switch in respect thereto and also permits a limited amount of canting movement of the rotor switch in respect to the housing. The central shaft of the rotor switch being connected in a loose fitting manner to a socket within a plug. The plug being mounted in a loose fitting manner within an opening in the printed circuit board. A pair of electrical contact elements are connected to the plug. Each of the contact elements include portions which are in physical contact with appropriate printed circuits formed upon the printed circuit board. The portions of the contact elements in contact with the printed circuit board are formed like a spring which exert a bias upon the plug tending to maintain such in axial alignment within the opening in the printed circuit board. However, a limited amount of canting movement of the plug with respect to the printed circuit board can occur without affecting the electrical interconnection between the contact elements in the printed circuit board.

BRIEF DESCRIPTION OF THE DRAWINGS

FIG. 1 is a front view of a typical meter which would employ the elements of construction of this invention;

FIG. 2 is a cross-sectional view of the meter of this invention taken along line 2—2 of FIG. 1;

FIG. 3 is a view partly-in-section taken along line 3—3 of FIG. 2;

FIG. 4 is a view of the lower side of the printed circuit board taken along line 4—4 of FIG. 2;

FIG. 5 is an exploded isometric view of the selector means for the meter of this invention; and FIG. 6 is an electrical schematic of the meter of this invention.

DETAILED DESCRIPTION OF THE SHOWN EMBODIMENT

Referring particularly to the drawings, there is shown in FIG. 1 an electrical instrument such as a meter 10 which is mounted within a housing 12 with a handle 14 being connected to the housing 12. Electrical wires 16 and 18 are to be connected to appropriate electrical devices (not shown) in order to take electrical readings. The electrical readings are to be observable by the operator through the lens 20 upon the face 22 of the dial. The face 22 is to include an appropriate scale of scales which are to be read by observing the position of the movable needle 24. The needle 24 is to be operated by a conventional D'arsonval movement which is well known in the field of electrical meters and need not be described here in detail.

The housing 12 includes a base 26 to which is attached a cover 28. Upon the cover 28 is mounted a selector knob 30 with the knob 30 being movable to a plurality of different positions (actually six in number in the shown embodiment). The six positions to which the knob 30 can be moved is denoted by indicia 32. For each position of the knob 30, a particular individual scale upon the face 22 is to be observed. Upon moving of the knob 30 to a different position, a different individual scale is to be observed.

Formed in the cover 28 is a first opening 34 and a second opening 36. Extending within the first opening 34 is an actuator 38 for a conventional switching mechanism 40. The switching mechanism 40 is to preselect the meter 10 of this invention to take readings on either a six cylinder automobile or a four cylinder and eight cylinder automobile. This switch 40 is mounted upon and is electrically connected to appropriate circuitry upon printed circuit board 42. The board 42 is fixedly mounted by threaded fasteners 44 to the underside of the cover 28. The second opening 36 is to permit insertion of a tool such as a screw driver so as to initially position the needle 24 at the zero position determined by the scales upon the face 20.

The knob 30 has an interior recess 46 and is to connect with the shaft of a switch rotor 48. The switch rotor 48 includes a pair of diametrically spaced apart arms 50 and 52 extending transversely from the center shaft 54 of the switch rotor 48. The shaft 54 has formed thereon a flange 56 which is spaced from the arms 50 and 52. The flange 56 is of an odd configuration and is to cooperate with an appropriate mating opening 58 formed within a panel bushing 60. The shaft 54 is conducted through the opening 58 and it can only be conducted therethrough when a particular position is established between the panel bushing 60 and the shaft 54 which has been established by the configuration of the flange 56 in the opening 58. However, once the panel bushing 60 is completely inserted upon the rotor switch 48 so that the base of the panel bushing 60 rests against the arms 50 and 52, 360° rotational movement is permitted of the panel bushing 60 with respect to the rotor switch 48.

A third opening 62 is formed within the cover 28. The shaft 56 of the rotor switch extends through the opening 62 and also a portion of the panel bushing 60 extends through the opening 62. The base of the bushing 60 is to come into abutting contact with the underside of the cover 28 and a push-on nut 64 is to secure the bushing 60 to the cover 28.

It is to be noted that the opening 58 is slightly larger than the shaft 54. This permits a limited amount of canting movement of the shaft 54 with respect to the panel bushing 60. This is desirable so as not to require that the panel bushing 60 and the rotor switch 48 be constructed with a high degree of tolerance, and if the parts when assembled are slightly misalinged with respect to one another, the misalignment can be readily absorbed by slight canting of the shaft 54. Although the shaft might be slightly canted a few thousandths of an inch, there is no hindrance in the operation of the device and the device operates with 100 percent effectiveness.

Located on the underside of the cover 28 are a plurality of protuberances 66. Also formed on the underside of the cover 28 are more enlarged protuberances which are diametrically located with respect to the opening 62 and are referred to as stops 68. With the panel bushing 60 connected to the housing 28, the arms 50 and 52 are forced into tight contact with the protuberances 66. With the arms 50 and 52 resting between an adjacent pair of protuberances 66, a given position of the shaft 54 is located. By exerting a certain amount of manual movement upon the knob 30, the arms 50 and 52 can be moved from an adjacent pair of protuberances to another adjacent pair of protuberances and thereby locating the shaft 54 in another position. It is to be noted that by counting the number of protuberances 66 that there is six in number of positions of the shaft 54 which corresponds to the six positions determined by the indicia 32. At either end of the six positions, the arms 50 and 52 will come into abutting contact with the stops 68.

The free end of the shaft 54 is to be located within a socket 70 formed within a plug 72. The shaft 54 is to form a sloppy fit within the socket 70 thereby not requiring any high degree of tolerance between the shaft 54 and the plug 72. The plug 72 is to cooperate in a loose fitting manner within an opening 74 formed within the printed circuit board 42. The inner end 76 of the plug 72 is formed non-circular and is to retain thereabout in succession a first insulator 78, a first contact element 80, a second insulator 82, a second contact element 84 and a push-on nut 86. Rotation of the insulators 78 and 82 and the contact elements 80 and 84 with respect to the plug 72 are permitted due to the non-circular inner end 76 of the plug 72. The insulators 78 and 82 are to be formed of a non-electrically conductive material such as fiberous paper or the like. The contact elements 80 and 84 are to be constructed of a electrically conductive material such as copper.

The insulator 78 is to rest against a shoulder 88 formed upon the plug 72. The height of the shoulder 88 is selected to be greater than the width of the board 42 so that when the outer flange 90 of the plug 72 rests against the upper surface of the printed circuit board 42, a loose fit is established between the board 42 and the plug 72 because the height of the shoulder 88 is substantially greater than the thickness of the board 42. The reason for this is so that a limited amount of canting movement of the plug 72 can occur with respect to the board 42. This is so that the manufacturing tolerances of the elements can be minimized and not accomplished with any high degree of precision.

The contact element 80 includes a first contact arm 92 and a second contact arm 94. The contact points 96 anad 98 formed respectively on the arms 92 and 94 are located regularly in line with respect to each other which has been accomplished by the different configuring of the arms 92 and 94. A similar arrangement occurs with respect to the contact element 84 by means of the arms 100 and 102 and the contact points 104 and 106 respectively. It is to be noted that the contact points 104 and 106 are diametrically located opposite to contact points 96 and 98.

It is to be noted that the forming of the arms 92, 94, 100 and 102 is so that they inherently function as a spring and have a certain amount of resilience. When the contact elements 80 and 84 are completely assembled and connected to the plug 72, the contact points 104 and 106 and 96 and 98 are to be in physical contact with the printed circuitry 108 formed on the underside of the printed circuit board 42. Because the springing action is distributed due to the diametrically opposite alignment of the arms 92, 94, 100 and 102, the plug 72 is constantly tended to be axially aligned with respect to the opening 74 within the board 42. However, if there is any slight misalignment in the assembling of the parts, the plug 72 can readily cant to compensate for this misalignment without altering the electrical connection between the contact elements 80 and 84 with respect to the printed circuit board 42. The springiness of the arms causes the arms to be maintained in constant physical contact with the printed circuitry 108 even though the plug 72 can be slightly canted with respect to the opening 74.

It is to be understood that as the knob 30 is turned, the contact elements 80 and 84 are rotated with the plug 72. The diametrically opposite arrangement of the contact points 96, 98, 104 and 106 is constantly maintained during this rotation.

The circuitry 108 is arranged to operate with the novel contact arrangement previously explained. Referring particularly to FIG. 6 of the drawings, the circuitry 108 is to be explained in reference to making certain meter tests upon an automobile. The circuit paths formed upon the printed circuit board 42 comprise a series of small blocks 110 and 112 and a pair of large blocks 114 and 116. It is to be understood that the circuitry depicted in FIG. 6 is merely by way of an example and that other types of circuitries can be employed in combination with the structure of this invention.

If it is desired to test for excessive resistance in the ignition points of the automobile, the knob 30 would be moved to the particular position denoted by indicia 32 wherein the arm 92 would be in contact with the block 110 which is connected to the points portion of the circuitry. The arm 94 would be connected to block 114 with arm 100 connected with block 116 and arm 102 would be connected with block 112. Block 112 is connected directly to ground.

If it is desired to determine the dwell angle of the ignition points during the ignition cycle of the automobile, the knob 30 would be turned so that the contact elements would be located in the position shown in FIG. 6.

Other tests can be made with the meter apparatus 10 of this invention such as measuring engine revolutions per minute and are represented in FIG. 6 as "low tach" "high tach." It is to be understood that the block diagrams for low tach and high tach are to represent circuitry for the particular tests. It is to be noted that in each of these instances that the circuitry is divided, in other words, low tach circuitry is provided prior to block 110 with also additional low tach circuitry being provided between ground and block 112. This is an additional feature of the structure of this invention which permits circuitry to be provided prior to the supply of energy to the D'arsonval movement and also after the supply of energy to the D'arsonval movement and before the ground connection.

There are two additional tests which could be performed and are represented by "volts" and "amps." The volts is to represent a voltmeter test which will be used to measure the battery voltage while cranking and the charging system voltage while running. Other uses for the voltmeter test can be to measure voltage at various points in a circuit or determining the area of excessive resistance in a circuit.

The ammeter test is to be used to test the charging systems for correct current output. The ammeter test can also be used to measure the current draw of any circuit and during certain pinpoint tests of the charging system.

The transmission of electrical energy in any given test is accomplished basically in the same way. By way of example, referring to the position shown in FIG. 6 where it is established for the dwell test, the electrical energy would be conducted from a positive source due to appropriate connection of the wires 16 and 18 to certain positions within the vehicle. The electrical energy would be conducted through the dwell portion of the circuit into block 110, through arm 92, into arm 94 and into block 114. The energy would then be conducted to operate the D'arsonval movement which is represented generally in FIG. 6 by numeral 118. The energy is then conducted to printed circuit block 116, into arm 100 of contact element 84, and thereupon to arm 102 into block 112. Since block 112 is connected directly to ground, a completion of the electrical circuit has occurred. This same type of transmission of electrical energy would occur in any of the six positions established by the knob 30.

What is claimed is:

1. In combination with an electrical meter apparatus, said electrical meter apparatus being mounted within a housing, said housing being connected with visual observation means for denoting various electrical readings, electronic circuitry mounted upon a printed circuit board, said printed circuit board located within said housing, said electrical circuitry connected to operate said visual observation means, said electronic circuitry including a plurality of separate circuit paths, the improvement comprising:

selector means connected to said housing and being movable to select an individual said circuit path of said plurality of separate circuit paths, said selector means including a plug rotatably mounted within an oversize opening within said printed circuit board, said plug capable of a limited amount of canting movement relative to said printed circuit board, an electrical contact element attached to said plug with a portion of said contact element to be in physical contact with said printed circuit board, said portion comprising a spring, the force of said spring tending to maintain said plug axially aligned within said oversized opening;

there being two in number of said electrical contact elements, said electrical contact elements being fixedly connected together so as to move together relative to said printed circuit board, said portions of said contact elements being aligned 180° apart; and said selector means including a manually operatable knob located exteriorly of said housing, said knob being connected with a switch rotor, said switch rotor extending through an opening in said housing, a portion of said switch rotor cooperating in a loose fitting manner with a socket formed within said plug, a panel bushing located upon said switch rotor, said panel bushing being fixedly connected to said housing, said switch rotor being rotatable with respect to said panel bushing, the interconnection between said panel bushing and said switch rotor permitting a limited amount of canting movement of said switch rotor relative to said panel bushing.

2. The combination as defined in claim 1 wherein: said switch rotor includes means thereon to prevent axial movement of said panel bushing with respect to said switch rotor.

3. The combination as defined in claim 2 wherein: said switch rotor including a center shaft from which extends transversely a pair of arms diametrically spaced about said shaft, said arms to cooperate with stop means formed upon said housing to limit the amount of pivotal movement of said center shaft relative to said housing.

4. The combination as defined in claim 3 wherein: said amount of limited movement being 180°.

* * * * *